(12) United States Patent
Oakes (10) Patent No.: US 8,201,535 B2
(45) Date of Patent: Jun. 19, 2012

(54) AIR INTAKE DEVICE

(75) Inventor: Philip A. Oakes, Dublin, OH (US)

(73) Assignee: Honda Motor Company, Ltd., Tokyo (JP)

( * ) Notice: Subject to any disclaimer, the term of this patent is extended or adjusted under 35 U.S.C. 154(b) by 589 days.

(21) Appl. No.: 12/397,759

(22) Filed: Mar. 4, 2009

(65) Prior Publication Data

US 2010/0224158 A1 Sep. 9, 2010

(51) Int. Cl.
*F02M 35/10* (2006.01)
*B60K 13/02* (2006.01)

(52) U.S. Cl. ......... 123/184.51; 123/184.21; 123/184.56; 180/68.3

(58) Field of Classification Search ............. 123/184.21, 123/184.56; 180/68.3
See application file for complete search history.

(56) References Cited

U.S. PATENT DOCUMENTS

| | | | |
|---|---|---|---|
| 2,336,010 A | 12/1943 | Gregory et al. | |
| 3,599,875 A * | 8/1971 | Wynosky et al. | 239/265.37 |
| 4,418,879 A * | 12/1983 | Vanderleest | 244/53 B |
| 4,440,255 A | 4/1984 | Shinozaki | |
| 4,479,676 A * | 10/1984 | Hayes | 296/78.1 |
| 4,719,758 A | 1/1988 | Sumser | |
| 5,025,629 A | 6/1991 | Woollenweber | |
| D340,513 S | 10/1993 | Stahel, II et al. | |
| 5,307,771 A | 5/1994 | Stahel, II et al. | |
| 6,422,201 B1 * | 7/2002 | Yamada et al. | 123/336 |
| 6,463,901 B1 * | 10/2002 | Cuddihee et al. | 123/184.21 |
| 6,736,100 B2 * | 5/2004 | Katayama | 123/184.21 |
| 6,941,926 B2 * | 9/2005 | Fagala | 123/336 |
| 7,051,824 B1 | 5/2006 | Jones et al. | |
| 7,210,444 B2 * | 5/2007 | Korenjak et al. | 123/184.55 |
| 7,210,652 B2 * | 5/2007 | Hein et al | 244/53 B |
| 7,226,119 B1 * | 6/2007 | Weaver | 296/180.1 |
| 7,461,814 B2 * | 12/2008 | Hein et al. | 244/53 B |
| 7,530,417 B2 * | 5/2009 | Domergue | 180/68.3 |
| 2007/0151788 A1 | 7/2007 | Runolfson | |

FOREIGN PATENT DOCUMENTS

JP 02290720 A * 11/1990
WO WO 2007030097 A1 * 3/2007

* cited by examiner

*Primary Examiner* — Noah Kamen
*Assistant Examiner* — Grant Moubry
(74) *Attorney, Agent, or Firm* — Ulmer & Berne LLP (57) ABSTRACT

An air intake device for a vehicle is provided. The air intake device includes a housing that defines a plenum and is configured for mounting on a vehicle. The air intake device also includes an air scoop that is movably coupled to the housing. The air scoop is movable between a stowed position and a deployed position. The air intake device also includes a valve assembly coupled to the air scoop. The air scoop defines at least one ram air inlet port having a flow area. The at least one ram air inlet port is positioned to receive ram air and is in fluid communication with the plenum when the air scoop is in the deployed position. The valve assembly is operable for varying the flow area of the at least one ram air inlet port.

20 Claims, 8 Drawing Sheets

AIR INTAKE DEVICE

TECHNICAL FIELD

The present invention relates generally to vehicles and, more particularly, to an air intake device for a vehicle.

BACKGROUND

Various known devices can be used to increase the power output of an internal combustion engine during operation of an associated vehicle by increasing, or pressurizing, the airflow to a fuel system component which supplies a flammable fuel/air mixture to the engine. One device of this type can be used on a motorcycle having an internal combustion engine, with the device including a housing and a pair of rotatable butterfly valves connected to the housing. The airflow to a fuel system component can be varied during operation of the motorcycle by rotating the butterfly valves. While devices of this type have been used successfully, they can be subject to certain disadvantages. For example, the butterfly valves are always exposed to the air stream during operation of the motorcycle. During operation in inclement weather, for example rain, this can result in the undesirable introduction of excess moisture in the air supplied to the fuel system component which in turn can cause undesirable engine hydrolock. This can be especially undesirable in ram air or hypercharger systems.

SUMMARY

An air intake device for a vehicle is provided and includes a housing defining a plenum, with the housing being configured for mounting on a vehicle. The air intake device also includes an air scoop movably coupled to the housing. The air scoop is movable between a stowed position and a deployed position. The air intake device also includes a valve assembly coupled to the air scoop. The air scoop defines at least one ram air inlet port having a flow area. The at least one ram air inlet port is positioned to receive ram air and is in fluid communication with the plenum when the air scoop is in the deployed position. The valve assembly is operable for varying the flow area of the at least one ram air inlet port.

A vehicle is provided that includes a frame, at least one front wheel rotatably coupled to the frame and at least one rear wheel rotatably coupled to the frame. The vehicle also includes an engine supported by the frame, with the engine being operable for providing power for transmission to at least one of the at least one front wheel and the at least one rear wheel. The vehicle further includes a fuel system component in fluid communication with the engine and an air intake device that includes a housing connected to at least one of the frame, the fuel system component and the engine. The air intake device further includes an air scoop movably coupled to the housing and a valve assembly coupled to the air scoop. The housing defines a plenum that is in fluid communication with the fuel system component and the air scoop defines at least one ram air inlet port having a flow area. The valve assembly is operable for varying the flow area of the at least one ram air inlet port. The air scoop is movable between a stowed position wherein the at least one ram air inlet port is positioned within the plenum defined by the housing and a deployed position wherein the at least one ram air inlet port is positioned to receive ram air and operably directs ram air into the plenum.

A motorcycle is provided that includes a frame, a front wheel rotatably coupled to the frame and a rear wheel rotatably coupled to the frame. The motorcycle further includes an engine supported by the frame, with the engine being operable for providing power for transmission to at least one of the front wheel and rear wheel. The motorcycle also includes a fuel system component in fluid communication with the engine and further includes an air intake device. The air intake device includes a movable air scoop having a front wall. The front wall defines at least one ram air inlet port. The front wall and the at least one ram air inlet port are selectively exposed to ram air during operation of the vehicle. The at least one ram air inlet port is selectively in fluid communication with the fuel system component.

BRIEF DESCRIPTION OF THE DRAWINGS

Various embodiments according to the inventive principles will become better understood with regard to the following description, appended claims and accompanying drawings wherein:

DETAILED DESCRIPTION

Figure 1:
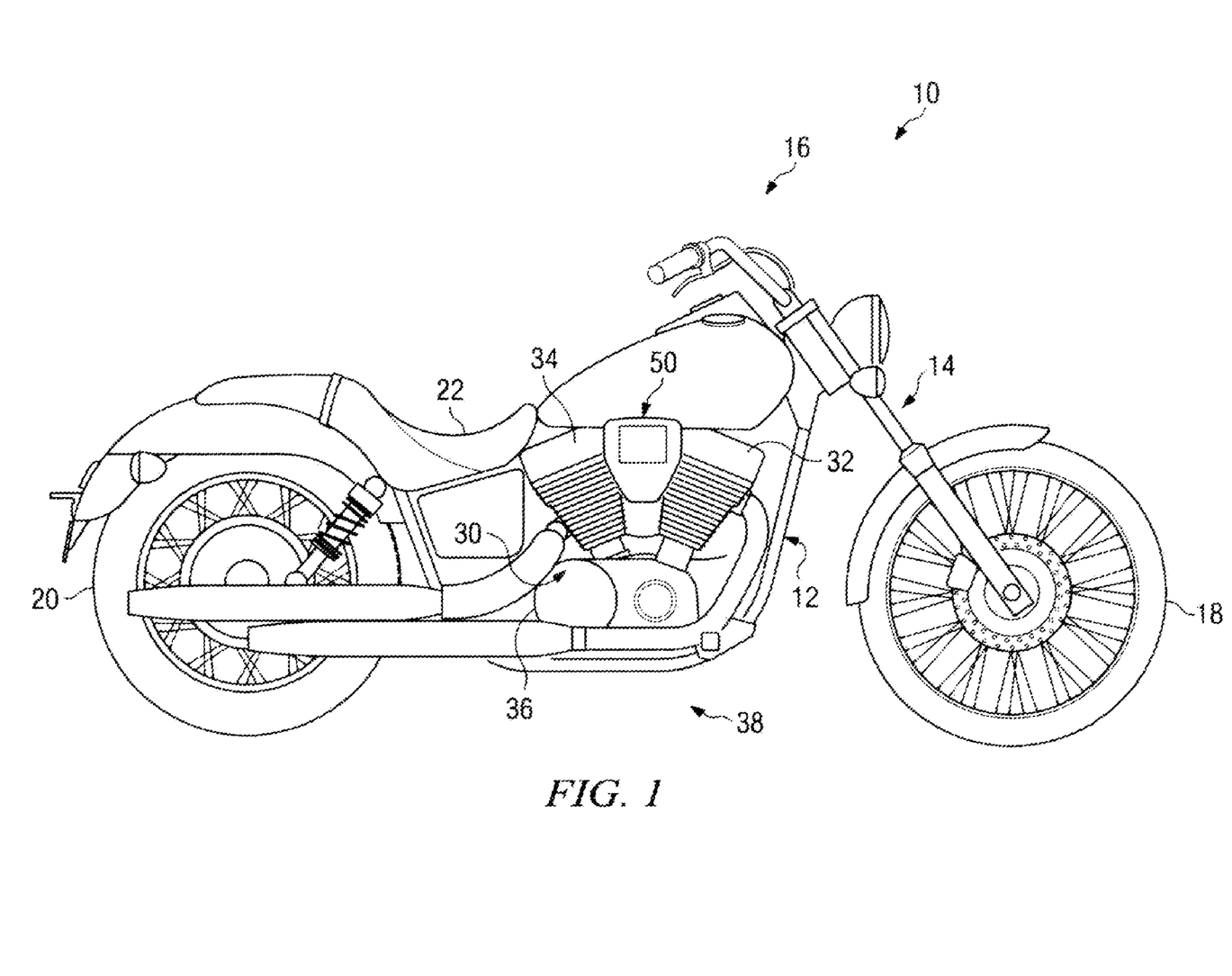
FIG. 1 is a side elevation view of a motorcycle having an air intake device.
Figure 2A:
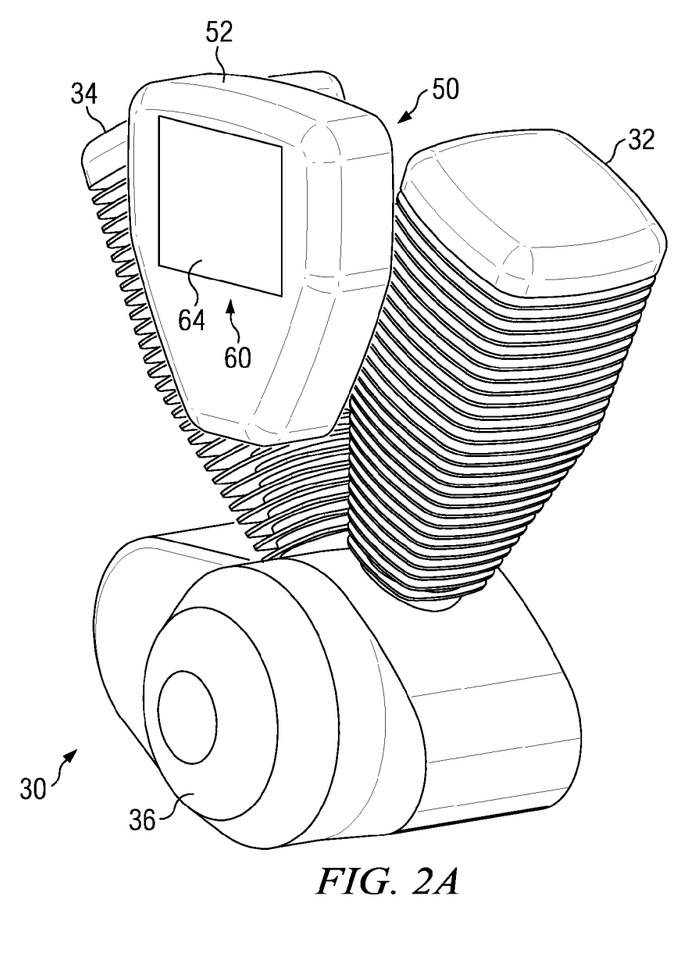
FIG. 2A is a right front perspective view of the engine and associated air intake device, according to one embodiment, of the motorcycle shown in FIG. 1, with a portion of the engine shown schematically and with the air scoop of the air intake device shown in a stowed position.
Figure 2B:
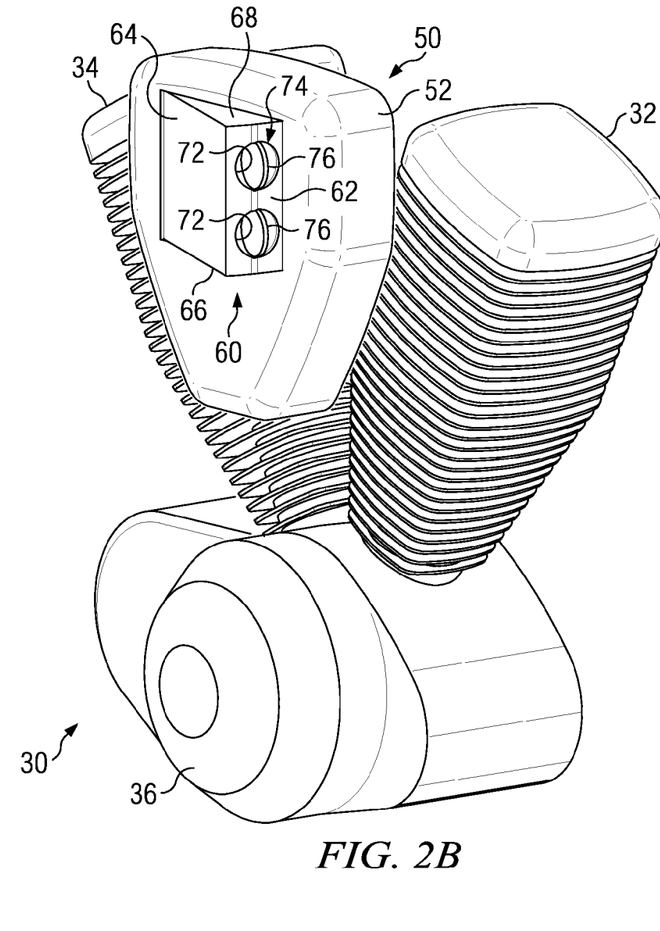
FIG. 2B is a right front perspective view similar to FIG. 2A, but with the air scoop shown in a deployed position.
Figure 3A:
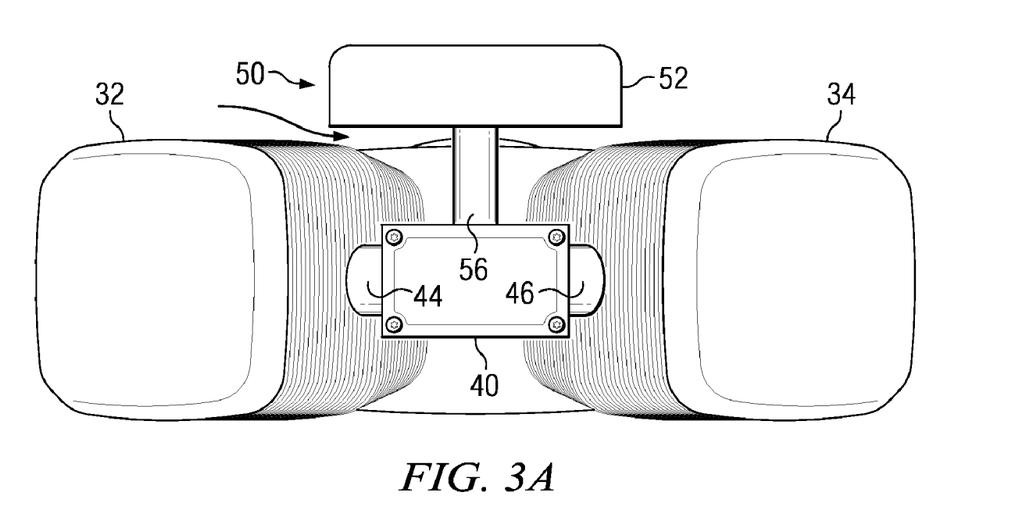
FIG. 3A is a top plan view of the engine and associated air intake device shown in FIGS. 1, 2A and 2B, as well as an associated fuel system component, with the air scoop of the air intake device shown in the stowed position and the fuel system component shown schematically.
Figure 3B:
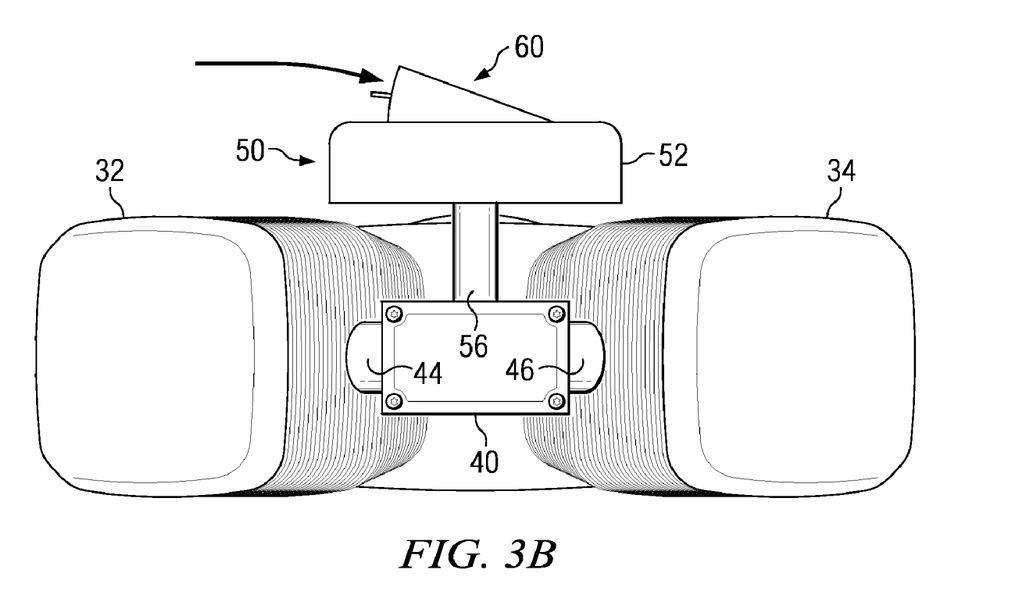
FIG. 3B is a top plan view similar to FIG. 3A, but with the air scoop shown in the deployed position.

FIG. 1 illustrates a motorcycle 10 that includes a frame 12 and also includes a front fork assembly 14 and handlebar assembly 16, each associated with the frame 12. Motorcycle 10 further includes a front wheel 18 and a rear wheel 20, each rotatably coupled to the frame 12. The front wheel 18 can be rotatably coupled to the front fork assembly 14 and the rear wheel 20 can be rotatably coupled to a swing-arm assembly associated with frame 12. Motorcycle 10 also includes one or more seats supported by frame 12. For example, as shown in FIG. 1, motorcycle 10 can include a seat 22 suitable for supporting an operator of motorcycle.

Motorcycle 10 also includes an engine, indicated generally at 30 in FIG. 1, that is operable for providing power for transmission to the rear wheel 20. Engine 30 can be drivingly coupled to the rear wheel 20 by various conventional drivetrains (not shown) known in the art. Engine 30 is an internal combustion engine and, as shown in FIG. 1, engine 30 can be a V twin engine having a first cylinder housing 32 and a second cylinder housing 34 mounted on and communicating with a crank case 36. Motorcycle 10 also includes a fuel system component 40 shown schematically in FIGS. 3A, 3B, 4A and 4B, associated with engine 30. The fuel system component 40 defines a plenum 42, shown in FIGS. 4A and 4B, which is in fluid communication with each of the cylinder housings 32, 34 of engine 30 via conduits 44 and 46, respectively.

Motorcycle 10 includes a right side 38 (FIG. 1) and a left side (not shown). Motorcycle 10 also includes an air intake device 50 that is associated with the fuel system component 40 and the engine 30. Air intake device 50 can also be used on a variety of other saddle-type vehicles such as motorcycles having different engine configurations, motorcycles having two or more front wheels and/or two or more rear wheels, scooters, all terrain vehicles and snowmobiles. The air intake device 50 includes a housing 52 that defines a plenum 54 as shown in FIGS. 5A and 5B. With reference to FIGS. 4A, 4B, 5A and 5B, fluid conduit 56 extends from the fuel system component 40 into plenum 54 and establishes fluid communication between plenums 42 and 54 as subsequently described further. The housing 52 of the air intake device 50 is shown in FIG. 1 to be positioned on the right side 38 of motorcycle 10, and is shown to be adjacent to engine 30 and laterally outward of engine 30 in FIGS. 2A, 2B, 3A and 3B. In one embodiment the fuel system component 40 can be a carburetor, with air from the air intake device mixed with fuel within fuel system component 40 in a manner known in the art. In another embodiment, engine 30 can be fuel injected. In this embodiment, fuel system component 40 can be a housing or manifold that receives air from the air intake device 50 and can direct the air to fuel intake valves (not shown) associated with cylinders 32, 34, where fuel can be injected by respective fuel injectors in a manner known in the art.

Figure 4A:
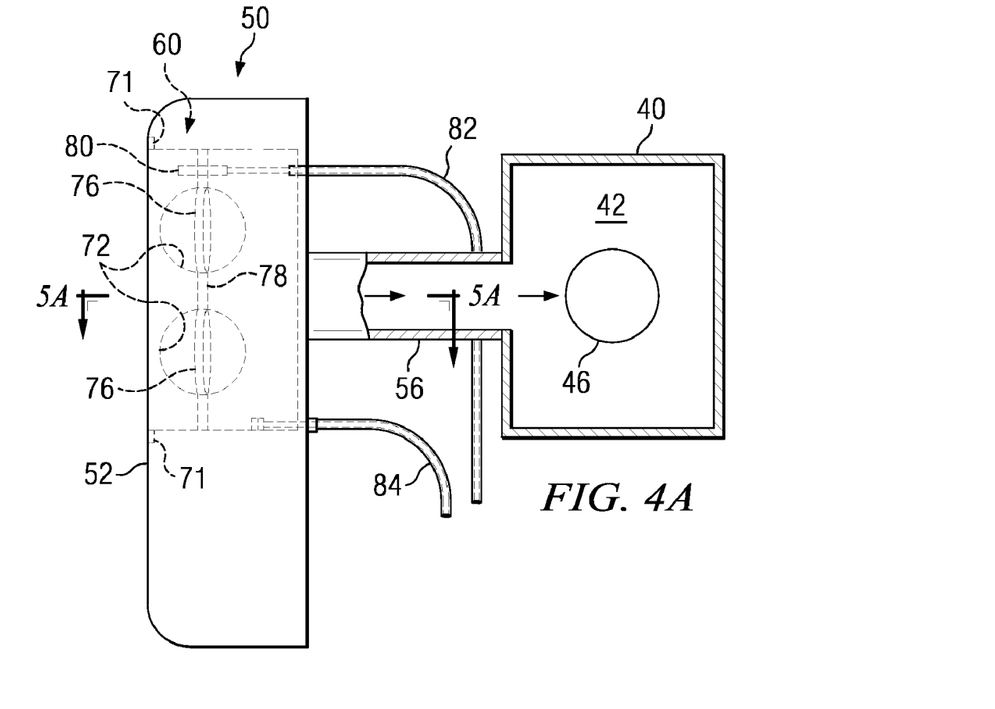
FIG. 4A is a front elevation view of the air intake device shown in FIGS. 1, 2A, 2B, 3A and 3B, and the fuel system component shown in FIGS. 3A and 3B, with the air scoop shown in the stowed position, with the fuel system component shown in cross-section and with certain hidden features shown in dashed lines.
Figure 4B:
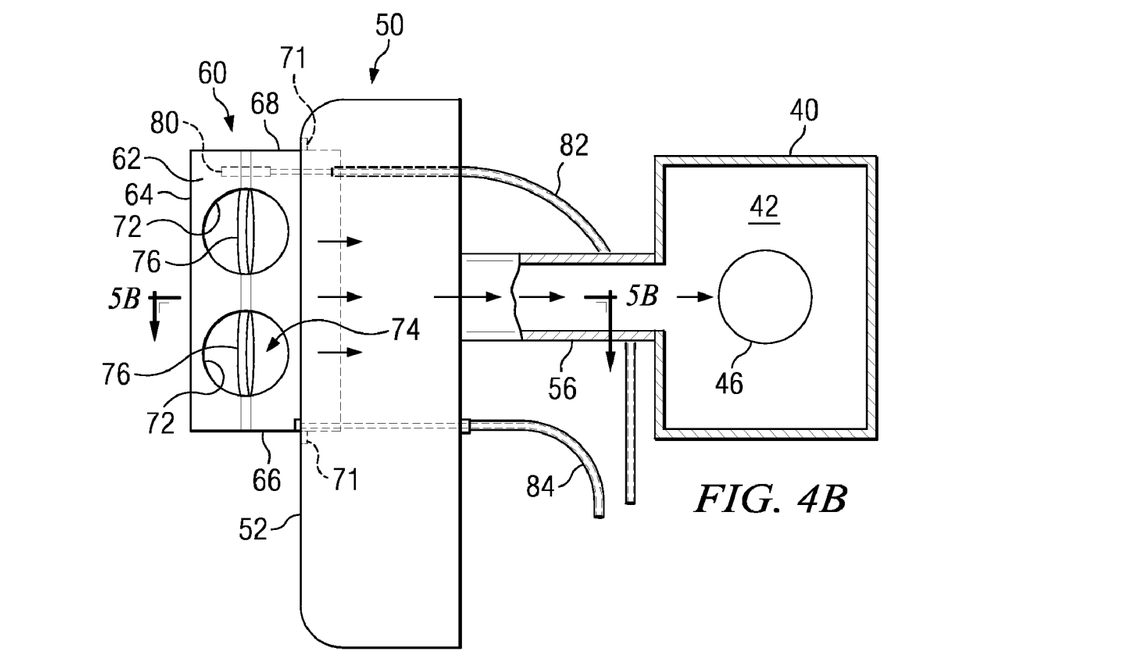
FIG. 4B is a front elevation view similar to FIG. 4A, but with the air scoop shown in the deployed position.
Figure 5A:
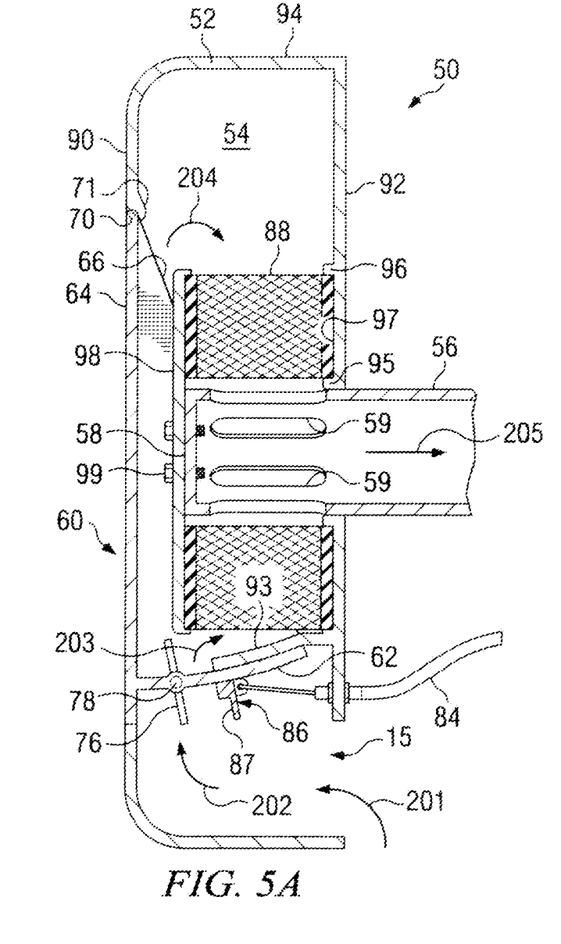
FIG. 5A is a cross-sectional view taken along line 5A-5A in FIG. 4A.
Figure 5B:
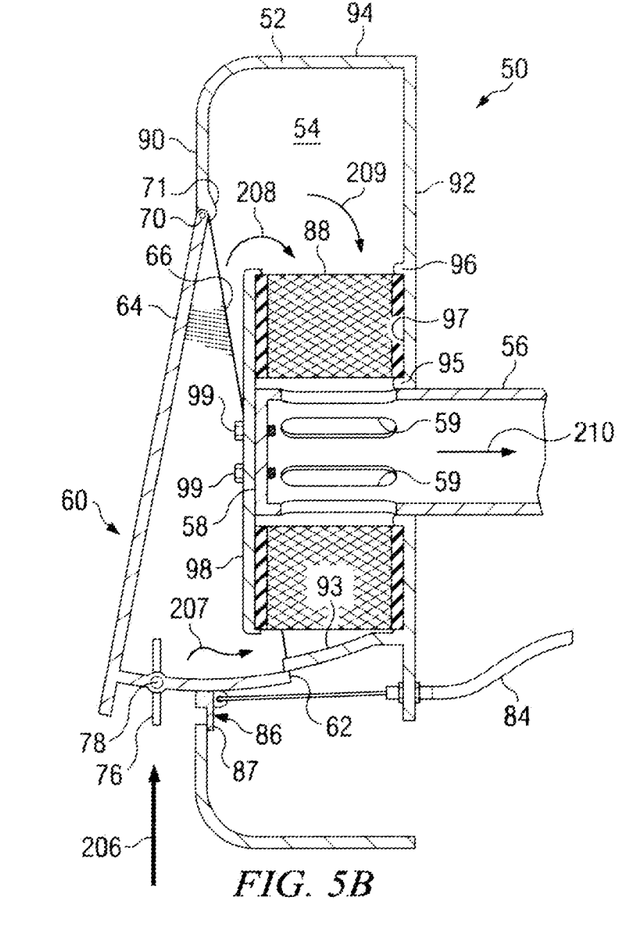
FIG. 5B is a cross-sectional view taken along line 5B-5B in FIG. 4B.

The air intake device 50 also includes an air scoop 60 that is movably coupled to the housing 52 and is movable between a stowed position shown in FIGS. 2A, 3A, 4A and 5A and a deployed position shown in FIGS. 2B, 3B, 4B and 5B. In the embodiments shown in FIGS. 1-6, the air scoop 60 is pivotably coupled to housing 52 and is pivotable between the stowed and deployed positions. The air scoop 60 can include a forward wall 62 and an outer wall 64. The air scoop 60 can also include a bottom wall 66 and a top wall 68, each integral with both the front wall 62 and the outer wall 64. The air scoop 60 can be pivotably coupled to housing 52 with a hinge pin 70 FIGS. 5A and 5B) and mating female hinge members 71 (FIGS. 4B, 5A and 5B). The outer wall 64 of air scoop 60 can be substantially flush with housing 52 when the air scoop 60 is in the stowed position.

The air scoop 60 defines at least one ram air inlet port having a flow area. In the embodiment shown in FIGS. 1-6, the front wall 62 of air scoop 60 defines a pair of ram air inlet ports 72, with each of the ram air inlet ports 72 having a flow area. When air scoop 60 is in the deployed position shown in FIGS. 2B, 3B, 4B and 5B, the ram air inlet ports 72 are positioned to receive ram air during operation of motorcycle 10. The air intake device 50 also includes a valve assembly 74 coupled to the front wall 62 of air scoop 60. Valve assembly 74 is operable for varying the flow area of each of the ram air inlet ports 72, which are in selective fluid communication with plenum 54 and therefore are also in selective fluid communication with fluid conduit 56 and plenum 42 of fuel system component 40. In the embodiment shown in FIGS. 4A, 4B, 5A and 5B, the valve assembly 74 includes two valve elements 76, each secured to a valve stem 78 that is rotatably mounted to the front wall 62 of air scoop 60. Each of the valve elements 76 can be a substantially flat plate. The valve assembly 74 can further include a cam 80 (FIGS. 4A and 4B) secured to the valve stem 78 for rotation with valve stem 78.

The air intake device 50 can include an actuating device 82 that is coupled to cam 80. Actuating device 82 can be various conventional devices, such as a Bowden cable as shown in FIGS. 4A and 4B. The actuating device 82 can be manually actuated by the operator of motorcycle 10 or can be automatically actuated in response to one or more measured parameters associated with the fuel system component 40 and/or engine 30. Linear movement of a portion of the actuating device 82 causes cam 80, valve stem 78 and valve elements 76 to rotate relative to air scoop 60. In one embodiment, valve elements 76 can rotate about 90° from a closed position (not shown) to an open position shown in FIGS. 2B, 3B, 4A, 4B, 5A and 5B. In the closed position, each valve element 76 can be generally parallel to the front wall 62 of air scoop 60 to prevent or at least substantially prevent the flow of air through the respective ram air inlet port 72. In the open position, each valve element 76 can be generally perpendicular to the front wall 62 of air scoop 60 to maximize the flow area of the respective ram air inlet port 72. The valve elements 76 can be rotated as required to achieve the desired flow area of the ram air inlet ports 72 for the particular operating condition of motorcycle 10.

The air intake device 50 further includes an actuating device 84 that is coupled to air scoop 60 and is operable for moving air scoop 60 between the stowed and deployed positions. Similar to actuating device 82, the actuating device 84 can be various conventional actuating devices, such as a Bowden cable as shown in FIGS. 4A, 4B, 5A and 5B. As with the actuating device 82, the actuating device 84 can be manually operated by the operator of motorcycle 10 or can be actuated in response to various operating parameters of the fuel system component 40 and/or engine 30. As shown in FIGS. 5A and 5B, the actuating device 84 can be coupled to a lug 86 or other protrusion, integral with the front wall 62 of air scoop 60, or actuating device 84 can be coupled to another portion of air scoop 60. Actuation of the actuating device 84 causes the air scoop 60 to pivot outward from the stowed position to the deployed position or to pivot inward from the deployed position to the stowed position as desired.

The air intake device 50 can include a filter 88, which can include a conventional porous material to permit air to flow through filter 88. Filter 88 can also include end caps, with the porous material sandwiched between the end caps, as is conventional. As shown in FIGS. 5A and 5B, housing 52 of the air intake device 50 can include an outer wall 90, an inner wall 92 and perimeter wall 94 extending between and integral with the outer 90 and inner 92 walls. Housing 52 can further include a first, relatively smaller diameter annular flange 95 and a second, relatively larger diameter annular flange 96.

Flanges 95 and 96 extend away from the inner wall 92 of housing 52 and define an annular channel 97. Channel 97 can be sized to receive filter 88 and, as shown in FIGS. 5A and 5B, filter 88 can be disposed entirely within plenum 54. In other embodiments, filter 88 can be disposed partially within plenum 54 and partially exterior of plenum 54. It may be appreciated that filters having other configurations can be provided which can be disposed either entirely or partially within plenum 54 and can be secured to housing 52 or another member of motorcycle 10 using mount members having a variety of other configurations. In another embodiment, a filter can be provided that is in fluid communication with plenum 54 but is entirely outside of plenum 54.

Figure 6:
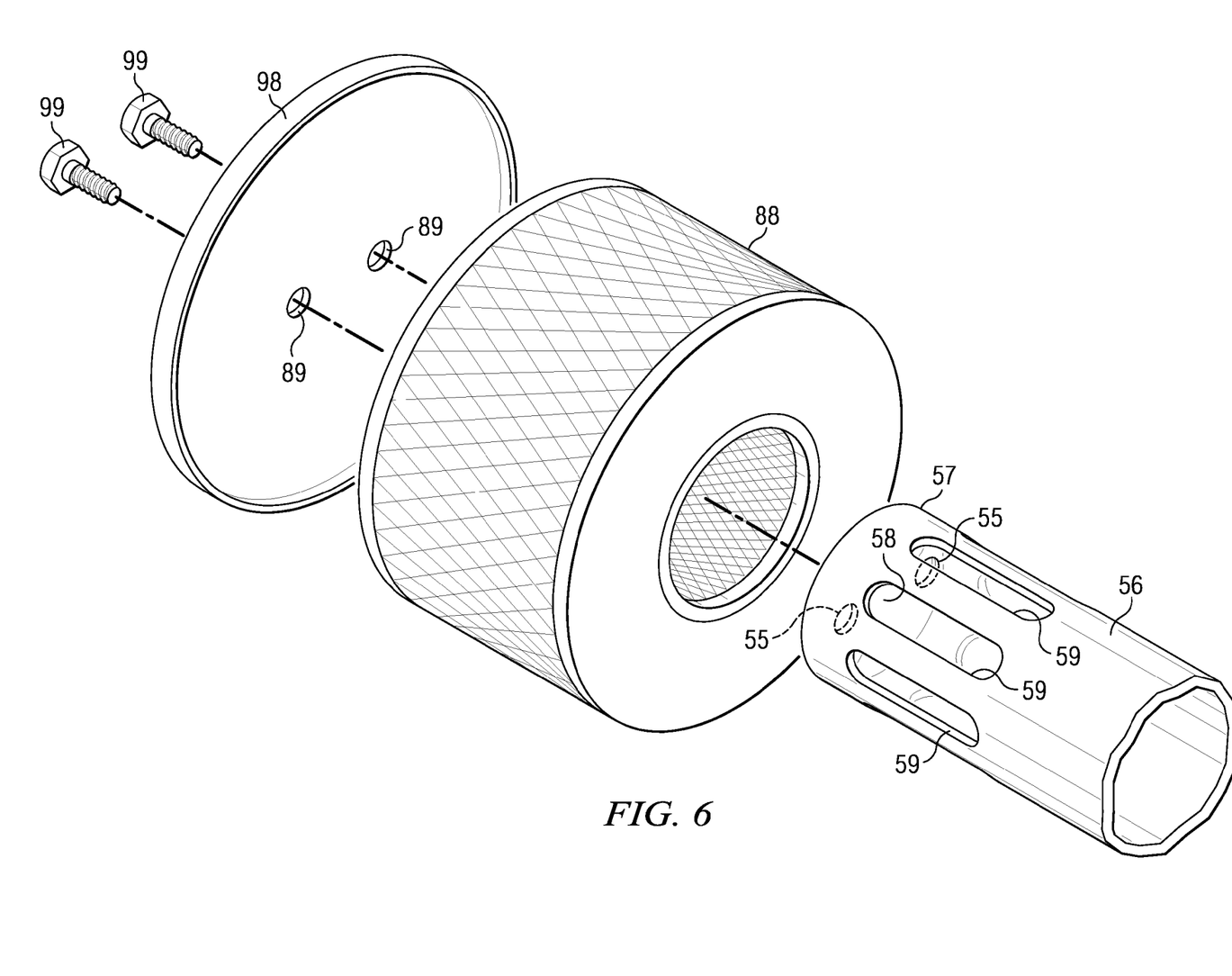
FIG. 6 is a perspective view of a filter according to one embodiment, of the air intake device shown in FIGS. 1, 2A, 2B, 3A, 3B, 4A, 4B, 5A and 5B and an associated retaining member and fluid conduit.

An outer end portion of fluid conduit 56 (identified as 57 in FIG. 6) can be disposed within plenum 54, with filter 88 surrounding the outer end portion 57. Air intake device 50 can also include a retention member 98 that can be secured to an end cap 58, which can be a plate, of the outer end portion 57 of fluid conduit 56 using conventional fasteners such as threaded bolts 99. Each bolt 99 can extend through an aperture 89 in retention member 98 and can be threaded into a threaded aperture 55 in cap 58. This clamps filter 88 between retention member 98 and housing 52 and secures housing 52 to fluid conduit 56, thereby connecting air intake device 50 to the fuel system component 40. In other embodiments, the air intake device 50 can be connected to fuel system component 40 in any of a variety of other suitable mount configurations or can be connected to one or both of the frame 12 and engine 30 in lieu of, or in addition to, the fuel system component 40. Regardless of the particular mounting of air intake device 50, the plenum 54 of air intake device 50 can be in fluid communication with the plenum 42 of fuel system component 40. The outer end portion 57 of fluid conduit 56 can include a plurality of apertures 59, which can be circumferentially spaced as shown in FIGS. 5A, 5B and 6. As a result of the porous material of filter 88 and apertures 59 in fluid conduit 56, plenum 54 is in fluid communication with the hollow interior of fluid conduit 56 and plenum 42 of the fuel system component 40. It will be appreciated that the shape, size, number and arrangement of apertures 59 can vary, depending on the particular application.

Housing 52 can include a guide member 93 that is integral with annular flange 96 and extends outwardly away from flange 96. Guide member 93 can be positioned adjacent to, and can be in contacting engagement with, the forward wall 62 of air scoop 60. Guide member 93 can have an arcuate cross-sectional shape that is complementary to an arcuate cross-sectional shape of the forward wall 62 of air scoop 60 as shown in FIGS. 5A and 5B. Accordingly, the forward wall 62 of air scoop 60 can travel along guide member 93 as air scoop 60 pivots between the stowed and deployed positions. As shown in FIG. 5B, the forward wall 62 can remain in contacting engagement with guide member 93 when air scoop 60 is in the deployed position. Lug 86 can include a forwardly extending lip 87 which can be disposed in contacting engagement with the outer wall 90 of housing 52 when air scoop 60 is in the deployed position as shown in FIG. 5B. Lip 87 can be a relatively rigid member or a resilient member, which can be made from an elastomeric material. In either case, lip 87 can be disposed in at least a substantially sealing engagement with the outer wall 90 of housing 52 when air scoop 60 is in the deployed position.

Figure 7A:
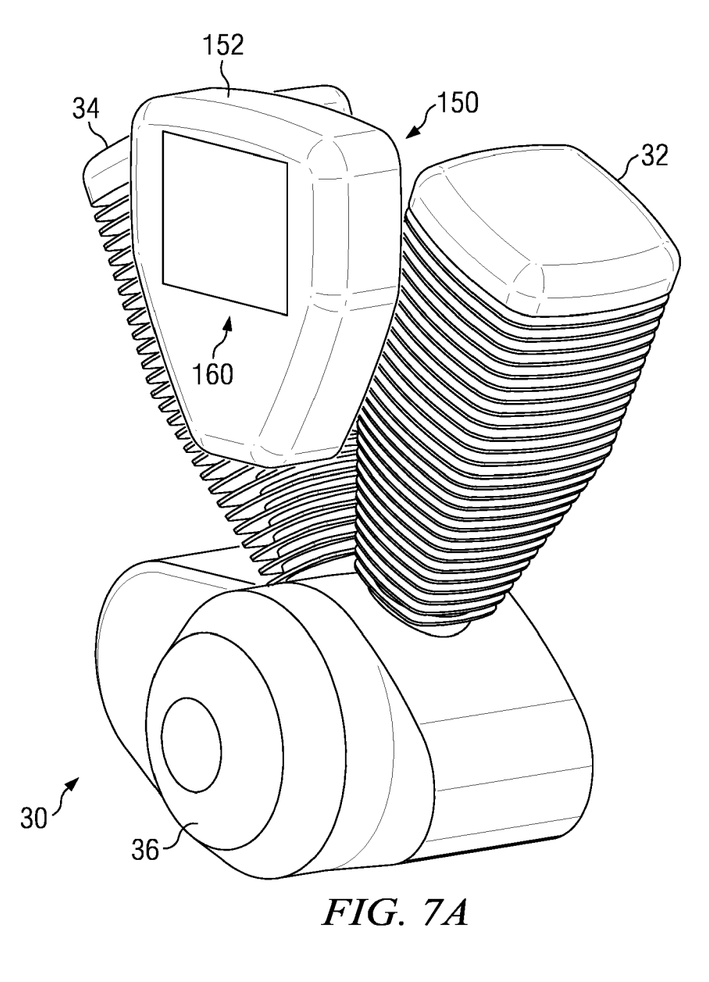
FIG. 7A is a right front perspective view of an engine and an air intake device according to another embodiment, with the air scoop of the air intake device shown in a stowed position.
Figure 7B:
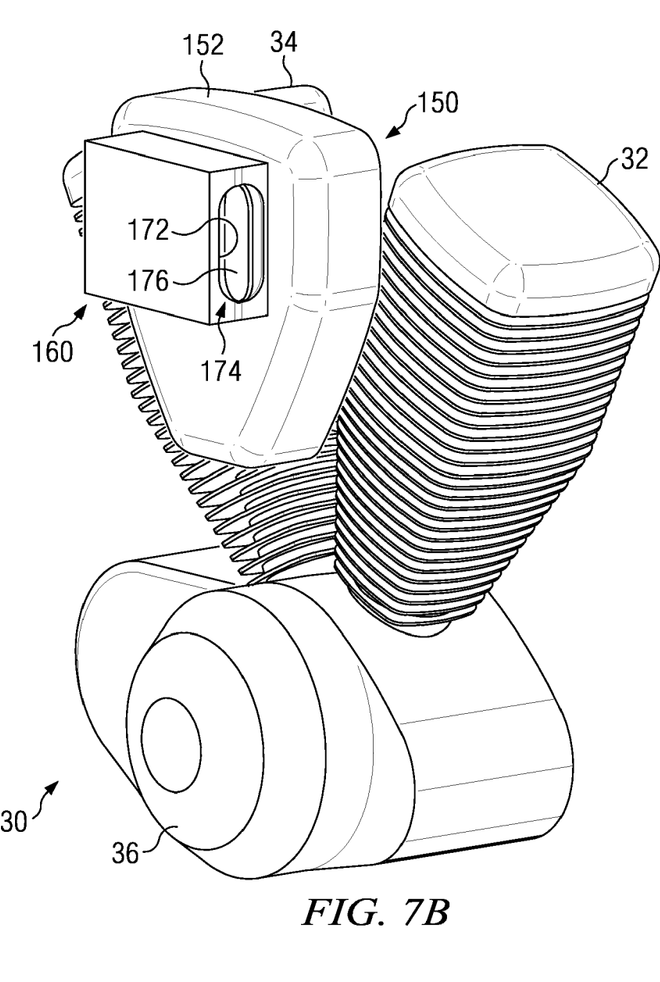
FIG. 7B is a right front perspective view similar to FIG. 7A, but with the air scoop shown in a deployed position.

FIGS. 7A, 7B, 8A and 8B illustrate an air intake device 150 that can be used with motorcycle 10 instead of air intake device 50. Air intake device 150 can also be used with motorcycles having other configurations or with other saddle-type vehicles such as those discussed in conjunction with air intake device 50. Air intake device 150 includes an air scoop 160 having a forward wall 162 that defines a ram air inlet port 172 and also includes a valve assembly 174 that is coupled to air scoop 160 and is operable for varying the area of the ram air inlet port 172. As shown in FIG. 7B, the valve assembly 174 includes a single valve element 176 that is rotatable with a valve stem 178 (FIGS. 8A and 8B) relative to air scoop 160. In other embodiments, an air scoop can be provided that defines two or more ram air inlet ports and a valve assembly can be provided that includes a like number of rotatable valve elements. The air intake device can also include an actuating device (not shown) that is operable for rotating the valve element 176 between open and closed positions as required to achieve the desired flow area of the ram air inlet port 172.

Figure 8A:
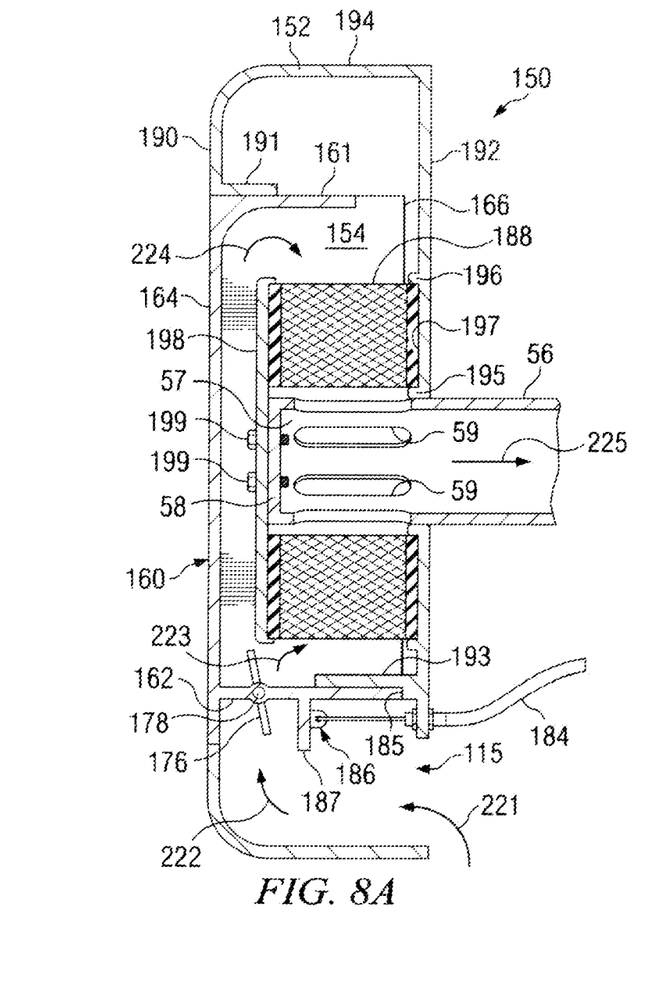
FIG. 8A is a cross-sectional view of the air intake device shown in FIGS. 7A and 7B, with the air scoop in the stowed position.
Figure 8B:
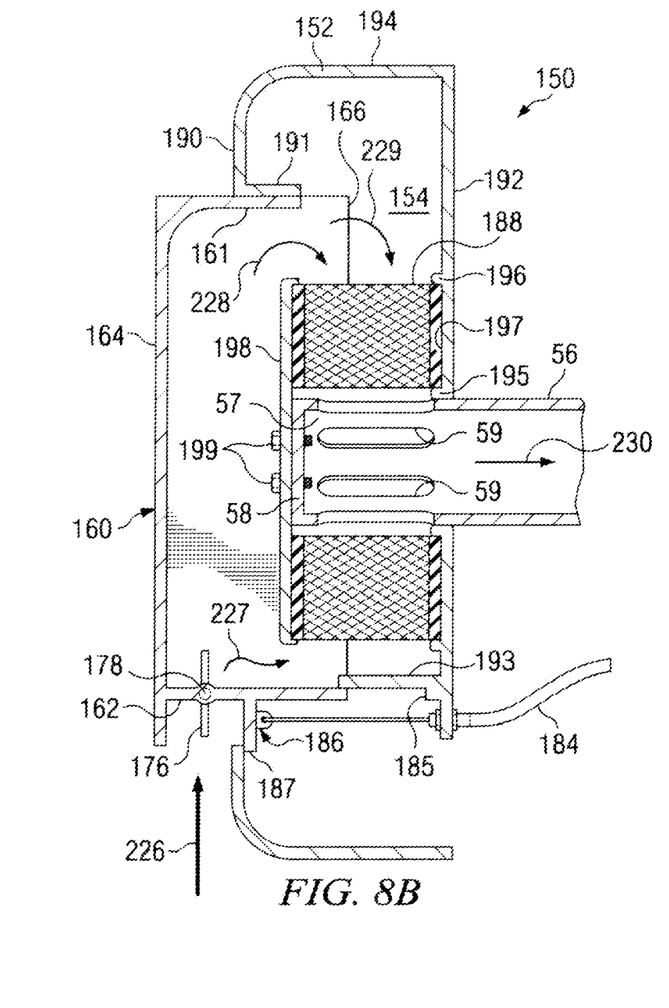
FIG. 8B is a cross-sectional view similar to FIG. 8A, but with the air scoop in the deployed position.

Air scoop 160 is translatable between a stowed position shown in FIGS. 7A and 8A and a deployed position shown in FIGS. 7B and 8B, as compared to air scoop 50 which pivots between stowed and deployed positions as described previously. An actuating device 184, which can be a Bowden cable or other convention actuating device, can be used to translate the air scoop 160 between the stowed and deployed positions, either manually or automatically in response to various parameters of fuel system component 40 and/or engine 30. As shown in FIGS. 8A and 8B, the actuating device 184 can be coupled to a lug 186, or other protrusion, integral with a forward wall of air scoop 160. Lug 186 can include a lip 187 that can be disposed in a contacting engagement, and at least a substantially sealing engagement, with an outer wall 190 of housing 152 when air scoop 160 is in the deployed position shown in FIGS. 7B and 8B. The ram air inlet port 172 is positioned to receive ram air when air scoop 160 is in the deployed position shown in FIGS. 7B and 8B.

Air intake device 150 can include a housing 152 that defines a plenum 154. Housing 152 can include a guide member 193 that can be positioned adjacent to, and can be in contacting engagement with, the forward wall 162 of air scoop 160. Housing 152 can also include a guide member 191 that is integral with the outer wall 190 of housing 152 and extends inwardly from the outer wall 190. Guide member 191 can be positioned adjacent to, and can be in contacting engagement with, a rear wall 161 of air scoop 160. The forward wall 162 of air scoop 160 can travel along guide member 193 and the rear wall 161 of air scoop 160 can travel along guide member 191, as air scoop 160 is translated between the stowed and deployed positions shown in FIGS. 8A and 8B. As shown in FIG. 8B, the forward wall 162 and the rear wall 161 of air scoop 160 can remain in contacting engagement with guide members 193 and 191, respectively, as air scoop 160 translates between the stowed position shown in FIG. 8A and the deployed position shown in FIG. 8B. Guide member 193 can include an inner shoulder 185 that can act as a stop when air scoop 160 is moving from the deployed position to the stowed position. Shoulder 185 can be sized to contact the forward wall 162 of air scoop 160 when an outer wall 164 of air scoop 160 is substantially flush with an outer wall 190 of housing 152.

The air intake device 150 can also include a filter 188 that can be disposed entirely within plenum 154 as shown in FIGS. 8A and 8B, similar to filter 88 of air intake device 50, which can be disposed entirely within the plenum 54 as shown in FIGS. 5A and 5B. However, in other embodiments, filters can be provided that are disposed partially within and partially exterior of the plenum 154. In another embodiment, a filter can be provided that is in fluid communication with plenum 154 but is disposed entirely outside of plenum 154. Filter 188 can include a porous material, which permits air to flow from plenum 154 through filter 188 and through the plurality of circumferentially spaced apertures 59 in the outer end portion 57 of fluid conduit 56 into the hollow interior of fluid conduit 56. As a result, plenum 154 of air intake device 150 is in fluid communication with the interior of plenum 42 of fuel system component 40.

Filter 188 can also include a pair of opposite end caps with the porous material sandwiched between the end caps. Filter 188 can be disposed within a channel 197 defined by annular flanges 195 and 196 of housing 152. Filter 188 can be clamped between a retention member 198, which can be secured to the end cap 58 of fluid conduit 56 using conventional fasteners such as bolts 199, and an inner wall 192 of housing 152, which secures housing 152 to fluid conduit 56 and connects the air intake device 150 with the fuel system component 40. In other embodiments, the air intake device can be connected to fuel system component 40 in any of a variety of other suitable mount configurations or can be connected to one or both of the frame 12 and engine 30 in lieu of, or in addition to, the fuel system component 40. Regardless of the particular mounting of air intake device 150, the plenum 154 of air intake device 150 can be in fluid communication with the plenum 42 of fuel system component 40.

During operation of motorcycle 10, air scoop 60 can remain in the stowed position shown in FIGS. 2A, 3A, 4A and 5A, during certain operating conditions, for example operation in rain or snow, to minimize the amount of moisture in plenum 54, fluid conduit 56 and the fuel system component 40. With air scoop 60 in the stowed position, air can flow through an opening 15 defined by the inner wall 92 and the perimeter wall 94 of housing 52, through ram air inlet ports 72 and through filter 88 into fluid conduit 56, as illustrated generally by flow arrows 201, 202, 203, 204 and 205 in FIG. 5A. The air can then flow to the fuel system component 40. Similarly, if air intake device 150 is used in lieu of air intake device 50, during certain operating conditions, for example operation in rain or snow, air scoop 160 can remain in the stowed position shown in FIGS. 7A and 8A and air can flow through an opening 115 defined by the inner wall 192 and a perimeter wall 194 of housing 152 of air intake device 150 into plenum 154, through the ram air inlet port 172, through filter 188 and into fluid conduit 56 as illustrated generally by flow arrows 221, 222, 223, 224 and 225 in FIG. 8A. The air can then flow to the fuel system component 40.

Under other operating conditions when the weather is not inclement, i.e. when it is not raining or snowing, for example, air scoop 60 can be pivoted to the deployed position shown in FIGS. 2B, 3B, 4B and 5B, such that the ram air inlet ports 72 are positioned to receive ram air illustrated generally flow arrow 206 in FIG. 5B. The valve elements 76 can be rotated to the desired positions to achieve the desired flow areas of the respective ram air inlet ports 72. The ram air flows through the ram air inlet ports 72 and is directed into plenum 54, then through filter 88 into the hollow interior of fluid conduit 56 as illustrated generally by flow arrows 207, 208, 209 and 210 in FIG. 5B. The air can then flow to the fuel system component 40. Similarly, if motorcycle 10 incorporates air intake device 150 in lieu of air intake device 50, the air scoop 160 can be translated from the stowed position shown in FIGS. 7A and 8A to the deployed position shown in FIGS. 7B and 8B as desired during certain operating conditions, for example when the weather is not inclement. In the deployed position, the ram air inlet port 172 is positioned to receive ram air illustrated generally by flow arrow 226 in FIG. 8B. The valve element 176 can be rotated to the desired position to achieve the desired flow area of the ram air inlet port 172. The ram air flows through the ram air inlet port 172 and is directed into plenum 154. The ram air then flows through filter 188 and through apertures 159 into the hollow interior of fluid conduit 56. The air can then flow to the fuel system component 40.

The flow of the ram air is illustrated generally by flow arrows 227, 228, 229 and 230 in FIG. 8B. The air can then flow to the fuel system component 40.

With air scoop 60 in the deployed position, the forward wall 62 of air scoop 60 can be disposed in contacting engagement with guide member 93 and the lip 87 of lug 86 can be disposed in at least a substantially sealing engagement with the outer wall 90 of housing 52. This maximizes the flow of relatively cold air to fuel system component 40, corresponding to the ram air flowing through ram air inlet ports 72 that is directed into plenum 54, since the flow of relatively warmer air around engine 30 and through the ram air inlet ports 72 into plenum 54 is at least substantially prevented. Similarly, when air scoop 160 is in the deployed position, the contacting engagement between the forward wall 162 of air scoop 160 and guide member 193 and the at least substantially sealing engagement between lip 187 of lug 186 and the outer wall 190 of housing 152. This maximizes the flow of relatively cold air to fuel system component 40, corresponding to the ram air flowing through ram air inlet port 172 that is directed into plenum 154, since the flow of relatively warmer air around engine 30 and through the ram air inlet port 172 into plenum 154, is at least substantially prevented.

The use of either the pivotable air scoop 60 or the translatable air scoop 160 results in several advantages. For example the torque and therefore the horsepower produced by engine 30, as well as the fuel efficiency of engine 30, can be significantly increased over certain engine operating speeds by deploying air scoop 60 or air scoop 160 and directing pressurized and relatively colder ram air into the plenums 54, 154 of the air intake devices 50, 150, respectively, and to the fuel system component 40, while minimizing the flow of relatively warmer air into the respective plenums 54, 154. Additionally, since the air scoops 60 and 160 can remain in the respective stowed positions during inclement weather operating conditions, unlike conventional devices which can include inlet ports exposed to ram air during all operating conditions, the amount of moisture introduced to fluid conduit 56, fuel system component 40 and engine 30 can be minimized or at least substantially reduced, which at least substantially reduces the chances of hydrolock occurring.

While the inventive principles have been illustrated by the description of various embodiments thereof, and while the embodiments have been described in considerable detail, it is not intended to restrict or in any way limit the scope of the appended claims to such detail. Additional advantages and modifications will be readily apparent to those skilled in the art. The invention in its broader aspects is therefore not limited to the specific details, representative apparatus, methods and examples shown and described. Accordingly, departures may be made from such details without departing from the scope or spirit of the general inventive principles.

What is claimed is:

1. An air intake device for a vehicle, the air intake device comprising:
   a housing comprising an inner wall and a perimeter wall, the housing defining a plenum, the housing being configured for mounting on a vehicle;
   an air scoop movably coupled to the housing, the air scoop being movable between a stowed position and a deployed position; and
   a valve assembly coupled to the air scoop; wherein
   the air scoop defines at least one ram air inlet port having a flow area, the at least one ram air inlet port being positioned to receive ram air and being in selective fluid communication with the plenum when the air scoop is in the deployed position;
   the valve assembly is operable for varying the flow area of the at least one ram air inlet port;
   the inner wall and the perimeter wall define an opening; and the housing and the air scoop are configured to operably permit air to flow through the opening to the at least one ram air inlet port when the air scoop is in a stowed position, the housing and the air scoop cooperating to at least substantially prevent air from flowing through the opening to the at least one ram air inlet port when the air scoop is in the deployed position.

2. The air intake device of claim 1, wherein:
the air scoop is pivotable relative to the housing between the stowed and deployed positions.

3. The air intake device of claim 1, wherein:
the air scoop is translatable relative to the housing between the stowed and deployed positions.

4. The air intake device of claim 2, wherein:
the valve assembly comprises at least one valve element, the at least one valve element being rotatable relative to the air scoop.

5. The air intake device of claim 3, wherein:
the valve assembly comprises at least one valve element, the at least one valve element being rotatable relative to the air scoop.

6. The air intake device of claim 4, further comprising:
a first actuating device coupled to the air scoop, the first actuating device being operable for pivoting the air scoop between the stowed position and the deployed position; and
a second actuating device coupled to the valve assembly, the second actuating device being operable for rotating the at least one valve element relative to the air scoop.

7. The air intake device of claim 5, further comprising:
a first actuating device coupled to the air scoop, the first actuating device being operable for translating the air scoop between the stowed position and the deployed position; and
a second actuating device coupled to the valve assembly, the second actuating device being operable for rotating the at least one valve element relative to the air scoop.

8. The air intake device of claim 6, wherein:
the at least one valve element comprises a plate.

9. The air intake device of claim 7, wherein:
the at least one valve element comprises a plate.

10. The air intake device of claim 1, further comprising:
a filter, the filter being at least partially disposed within the plenum.

11. The air intake device of claim 1, wherein:
the air scoop comprises an outer wall that is substantially flush with the housing when the air scoop is in the stowed position.

12. A vehicle comprising:
a frame;
at least one front wheel rotatably coupled to the frame and at least one rear wheel rotatably coupled to the frame; and
an engine supported by the frame and operable for providing power for transmission to at least one of the at least one front wheel and the at least one rear wheel;
a fuel system component in fluid communication with the engine; and
an air intake device comprising a housing connected to at least one of the frame, the fuel system component and the engine, the air intake device further comprising an air scoop movably coupled to the housing and a valve assembly coupled to the air scoop; wherein
the housing is positioned adjacent to and laterally outward of the engine;
the housing defines a plenum that is in fluid communication with the fuel system component;
the air scoop defines at least one ram air inlet port having a flow area;

the valve assembly is operable for varying the flow area of the at least one ram air inlet port; and
the air scoop is movable between a stowed position wherein the at least one ram air inlet port is positioned within the plenum defined by the housing and a deployed position wherein the at least one ram air inlet port is positioned to receive ram air and selectively direct ram air into the plenum.

13. The vehicle of claim 12, wherein:
the air scoop is pivotable relative to the housing between the stowed and deployed positions.

14. The vehicle of claim 12, wherein:
the air scoop is translatable relative to the housing between the stowed and deployed positions.

15. The vehicle of claim 13, wherein:
the valve assembly comprises at least one valve element, the at least one valve element being rotatable relative to the air scoop.

16. The vehicle of claim 14, wherein:
the valve assembly comprises at least one valve element, the at least one valve element being rotatable relative to the air scoop.

17. The vehicle of claim 15, further comprising:
a first actuating device coupled to the air scoop, the first actuating device being operable for pivoting the air scoop between the stowed position and the deployed position; and
a second actuating device coupled to the valve assembly, the second actuating device being operable for rotating the at least one valve element relative to the air scoop.

18. The vehicle of claim 16, further comprising:
a first actuating device coupled to the air scoop, the first actuating device being operable for translating the air scoop between the stowed position and the deployed position; and
a second actuating device coupled to the valve assembly, the second actuating device being operable for rotating the at least one valve element relative to the air scoop.

19. The vehicle of claim 12, wherein:
the air intake device further comprises a filter, the filter being at least partially disposed within the plenum; and
the vehicle further comprises a right side, and the housing of the air intake device is positioned on the right side.

20. A motorcycle comprising:
a frame;
a front wheel rotatably coupled to the frame and a rear wheel rotatably coupled to the frame;
an engine supported by the frame and operable for providing power for transmission to at least one of the front wheel and the rear wheel;
a fuel system component in fluid communication with the engine; and
an air intake device comprising a housing and an air scoop movably coupled to
the housing, the air scoop having a front wall, the front wall defining at least one ram air inlet port; wherein
the housing defines a plenum that is in fluid communication with the fuel system component;
the air scoop is movable between a stowed position wherein the at least one ram air inlet port is positioned within the plenum defined by the housing and a deployed position wherein the at least one ram air inlet port is positioned to receive ram air and selectively direct ram air into the plenum; and
the housing of the air intake device is positioned adjacent to and laterally outward of the engine.

* * * * *